US 8,974,862 B2

(12) United States Patent
Yu

(10) Patent No.: US 8,974,862 B2
(45) Date of Patent: Mar. 10, 2015

(54) METHOD OF MANUFACTURING COMPOSITE CARBON SHEET USING EXPANDED GRAPHITE SHEET AND MIXED DISPERSION SOLUTION

(76) Inventor: Jong-Sam Yu, Goyang (KR)

(*) Notice: Subject to any disclaimer, the term of this patent is extended or adjusted under 35 U.S.C. 154(b) by 484 days.

(21) Appl. No.: 13/505,805

(22) PCT Filed: Nov. 3, 2010

(86) PCT No.: PCT/KR2010/007686
§ 371 (c)(1),
(2), (4) Date: May 3, 2012

(87) PCT Pub. No.: WO2011/055961
PCT Pub. Date: May 12, 2011

(65) Prior Publication Data
US 2012/0219719 A1 Aug. 30, 2012

(30) Foreign Application Priority Data

Nov. 3, 2009 (KR) .................. 10-2009-0105664
Dec. 16, 2009 (KR) .................. 10-2009-0125295

(51) Int. Cl.
*B05D 1/28* (2006.01)
*B05D 3/12* (2006.01)
*B05D 1/02* (2006.01)
*C01B 31/00* (2006.01)
*C09K 5/14* (2006.01)

(52) U.S. Cl.
CPC . *C01B 31/00* (2013.01); *C09K 5/14* (2013.01); *Y10S 977/75* (2013.01); *Y10S 977/752* (2013.01); *Y10S 977/902* (2013.01)
USPC ............ 427/358; 427/428.01; 427/427.4; 977/750; 977/752; 977/902

(58) Field of Classification Search
USPC .......... 427/358, 428, 427, 421, 356; 977/750, 977/752, 902
See application file for complete search history.

(56) References Cited

U.S. PATENT DOCUMENTS

2007/0222112 A1* 9/2007 Christ et al. ............... 264/259
2007/0224425 A1* 9/2007 Christ et al. ............... 428/408
(Continued)

FOREIGN PATENT DOCUMENTS

| JP | 2002-009213 | 1/2002 |
| JP | 2002-038033 | 2/2002 |
| JP | 2006-298718 | 11/2006 |
| JP | 2007-121982 | 5/2007 |
| KR | 100628031 | 9/2006 |

(Continued)

OTHER PUBLICATIONS

International Search Report—PCT/KR2010/007686 issued on Aug. 30, 2011.

*Primary Examiner* — Dah-Wei D Yuan
*Assistant Examiner* — Kristen A Dagenais
(74) *Attorney, Agent, or Firm* — Cantor Colburn LLP

(57) ABSTRACT

Disclosed herein is a method of manufacturing a composite carbon sheet, including the steps of: mixing 70 parts by weight of a first solution as a dispersant with 30 parts by weight of a second solution as a binder to prepare a third solution; mixing 80~97 parts by weight of the third solution with 3~20 parts by weight of any one selected from the group consisting of single-wall carbon nanotubes, double-wall carbon nanotubes, multi-wall carbon nanotubes, carbon nanofibers, carbon nanoparticles, graphene and fullerene to prepare a fourth solution; dispersing the fourth solution to prepare a mixed dispersion solution; and coating an expanded graphite sheet with the mixed dispersion solution. The method is advantageous in that the thermal conductivity of the composite carbon sheet manufactured by this method can be improved, the physical properties thereof can be enhanced, the exfoliation thereof can be prevented, and the tensile strength and tear strength thereof can be improved.

6 Claims, 3 Drawing Sheets

(56) References Cited

U.S. PATENT DOCUMENTS

2008/0230203 A1* 9/2008 Christ et al. .................... 165/10
2011/0088931 A1* 4/2011 Lettow et al. ................. 174/257

FOREIGN PATENT DOCUMENTS

| KR | 1020070003626 | 1/2007 |
| KR | 1020070080546 | 8/2007 |

* cited by examiner

FIG. 3

| NO | Measured date | Sample name | Description | Temperature (°C) | Density (g/m³) | Specific heat (J/gK) | Diffusivity mm̄ 2/s | Thermal conductivity (W/mK) | Remarks |
|---|---|---|---|---|---|---|---|---|---|
| 1 | 08.7.22 | GR-BLACK | VASTEEM 1.0T (1.085) | 25 | 1.114 | 0.928 | 3.552 | 3.672 | vertically measured (only expanded graphite sheet) |
|  |  |  |  |  |  | 0.928 | 3.553 | 3.672 |  |
|  |  |  |  |  |  | 0.928 | 3.551 | 3.671 |  |
| 2 | 08.7.22 | GR-FRAY | VASTEEM 1.0T (1.032) | 25 | 1.600 | 0.811 | 3.936 | 5.105 | vertically measured (only expanded graphite sheet) |
|  |  |  |  |  |  | 0.811 | 3.913 | 5.067 |  |
|  |  |  |  |  |  | 0.811 | 3.933 | 5.101 |  |
| 3 | 09.09.25 | GR-NO.1 | VASTEEM 1.0T (0.31) | 25 | 1.085 | 0.698 | 9.241 | 6.998 | vertically measured (expanded graphite sheet impregnated with mixed dispersion solution) |
|  |  |  |  |  |  | 0.698 | 9.361 | 7.098 |  |
|  |  |  |  |  |  | 0.698 | 9.397 | 7.116 |  |

METHOD OF MANUFACTURING COMPOSITE CARBON SHEET USING EXPANDED GRAPHITE SHEET AND MIXED DISPERSION SOLUTION

BACKGROUND OF THE INVENTION

1. Technical Field

The present invention relates to a method of manufacturing a composite carbon sheet by coating an expanded graphite sheet with a mixed dispersion solution, and, more particularly, to a method of manufacturing a composite carbon sheet by applying a mixed dispersion solution including carbon nanowires, a dispersant, a binder and the like onto one side or both sides of an expanded graphite sheet.

2. Description of the Related Art

A conventional method of manufacturing an expanded graphite sheet includes the steps of: charging expanded graphite powder in a mold; pressing the expanded graphite powder at a predetermined pressure to form a primary product; rolling the primary product to a target thickness to form a secondary product; and cutting and bending the secondary product.

The above method of manufacturing an expanded graphite sheet is processed as follows.

Expanded graphite powder is charged in a mold, and is then pressed at a predetermined pressure to form an expanded graphite sheet.

However, this method is problematic in that, since the manufactured expanded graphite sheet has low strength, it is plastically deformed when it is pressed at a predetermined pressure or higher, and in that the thermal conductivity of the expanded graphite sheet in a horizontal direction is high (100~400 W/mk), but the thermal conductivity thereof in a vertical direction is low (3~5 W/mk) because the expanded graphite sheet is porous. Further, a conventional expanded graphite sheet is problematic in that it is expensive because it is entirely imported.

Meanwhile, another method of manufacturing an expanded graphite sheet comprises the steps of: enlarging the gap between graphite particles using sulfuric acid; removing the clay remaining in the gap using hydrofluoric acid; expanding the graphite particles using high heat of 600~1800° C. to form expanded graphite flakes; vibrating the expanded graphite flakes to form an expanded graphite flake layer; and continuously rolling the expanded graphite flake layer to produce an expanded graphite sheet. However, the expanded graphite sheet easily exfoliates. Therefore, a protective tape made of PE or PET is attached to one side of the expanded graphite sheet, and a double-sided tape made of PE or PET is attached to the other side thereof.

However, this method is also problematic in that pores are partially formed on the inside of the manufactured expanded graphite sheet and on the surface thereof, because the gap between the expanded graphite flakes cannot be completely removed, and in that the manufactured expanded graphite sheet easily exfoliates because of the inherent characteristic of graphite. Therefore, there is a problem in that the thermal conductivity of the expanded graphite sheet in a horizontal direction is high (100~400 W/mk), but the thermal conductivity thereof in a vertical direction is low (3~5 W/mk) because the density of the expanded graphite sheet is low.

Meanwhile, Korea Patent Registration No. 0628031 discloses a composite carbon sheet having high thermal conductivity, comprising: a carbon layer that is formed by pressing a mixture of expanded graphite powder and carbon nanotube (CNT) powder at high temperature; and a synthetic resin layer that is formed on at least one side of the carbon layer, which reinforces the carbon layer and which electrically insulates the carbon layer.

However, the composite carbon sheet is problematic in that the thermal conductivity thereof cannot be maximized because carbon nanotube particles cannot be charged between expanded graphite particles.

Further, the composite carbon sheet is problematic in that the thermal conductivity thereof cannot be maximized because an expanded graphite layer, a carbon nanotube layer, an adhesive layer, a heat-resistant film layer and a release paper are sequentially formed and thus the contact resistance between the layers increases.

SUMMARY OF THE INVENTION

Accordingly, the present invention has been devised to solve the above-mentioned problems, and an object of the present invention is to provide a method of manufacturing a composite carbon sheet, wherein an expanded graphite sheet is coated with a mixed dispersion solution to fill the pores of the expanded graphite sheet, so the thermal conductivity of the expanded graphite sheet in a vertical direction can be improved, the tensile strength and tear strength thereof can be enhanced, and it is possible to prevent the expanded graphite sheet from being exfoliated.

Another object of the present invention is to provide a method of manufacturing a composite carbon sheet, wherein a stable and environment-friendly expanded graphite sheet is prepared by forming an intercalation compound between graphite layers using lithium powder and paraffin and then heat-treating the intercalation compound, and the expanded graphite sheet is coated with a mixed dispersion solution to fill the pores of the expanded graphite sheet, so the thermal conductivity of the expanded graphite sheet in a vertical direction can be improved, the tensile strength and tear strength thereof can be enhanced, and it is possible to prevent the expanded graphite sheet from being exfoliated.

Still another object of the present invention is to provide a method of manufacturing a composite carbon sheet, which can prevent an expanded graphite sheet from being exfoliated by the side effects occurring during a process of coating the expanded graphite sheet with a mixed dispersion solution.

In order to accomplish the above objects, an aspect of the present invention provides a method of manufacturing a composite carbon sheet by coating an expanded graphite sheet with a mixed dispersion solution, comprising the steps of: preparing a first solution (dispersant) using water or one or more selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose (S110); preparing a second solution (binder) by mixing polyester with urethane at a predetermined mixing ratio or by mixing silane (adhesion enhancer) with epoxy at a predetermined mixing ratio (S120); preparing a third solution by mixing the first solution with the second solution at a predetermined mixing ratio (S130); preparing a fourth solution (final solution) by mixing the third solution with one or more carbon nanowires selected from the group consisting of single-wall carbon nanotubes, double-wall carbon nanotubes, multi-wall carbon nanotubes, carbon nanofiber, carbon nanoparticles, graphene and fullerene at a predetermined mixing ratio (S140); preparing a mixed dispersion solution by pouring the fourth solution (final solution) into a beaker or a dispersion container and then dispersing the fourth solution using a sonicator (S150); and coating an expanded graphite sheet with the mixed dispersion solution (S160).

BRIEF DESCRIPTION OF THE DRAWINGS

The above and other objects, features and advantages of the present invention will be more clearly understood from the following detailed description taken in conjunction with the accompanying drawings, in which:

FIG. 3 is a table showing the results of the test of the thermophysical properties of the composite carbon sheet manufactured by the method according to an embodiment of the present invention.

DESCRIPTION OF THE PREFERRED EMBODIMENTS

Figure 1:
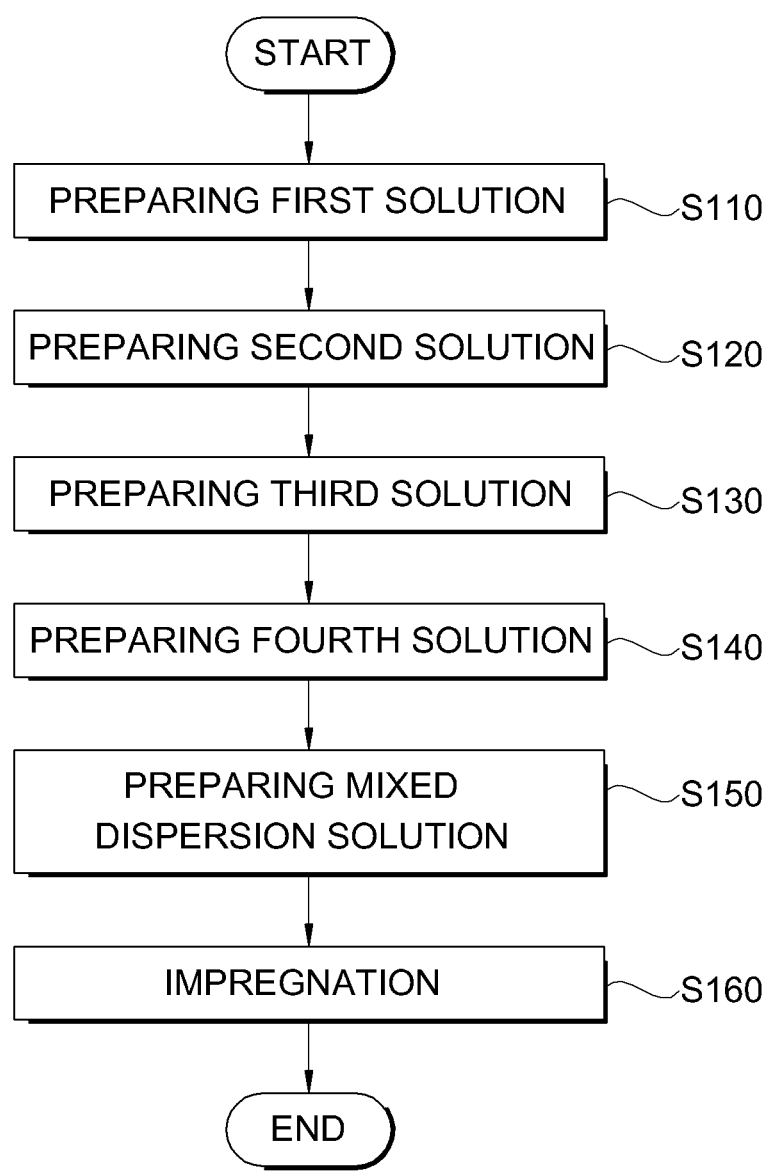
FIG. 1 is a flowchart showing a method of manufacturing a composite carbon sheet by coating an expanded graphite sheet with a mixed dispersion solution according to an embodiment of the present invention.

Hereinafter, preferred embodiments of the present invention will be described in detail.

Embodiment 1

The composite carbon sheet according to a first embodiment of the present invention is manufactured by a process including the steps of: preparing a first solution (dispersant) using water or one or more selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose; preparing a second solution (binder) by mixing polyester with urethane at a predetermined mixing ratio or by mixing silane (adhesion enhancer) with epoxy at a predetermined mixing ratio; preparing a third solution by mixing the first solution with the second solution at a predetermined mixing ratio; preparing a fourth solution (final solution) by mixing the third solution with one or more carbon nanowires selected from the group consisting of single-wall carbon nanotubes, double-wall carbon nanotubes, multi-wall carbon nanotubes, carbon nanofiber, carbon nanoparticles, graphene and fullerene at a predetermined mixing ratio; preparing a mixed dispersion solution by pouring the fourth solution (final solution) into a beaker or a dispersion container and then dispersing the fourth solution using a sonicator; and coating an expanded graphite sheet with the mixed dispersion solution.

In the step of dispersing the fourth solution, at least one selected from the group consisting of ball milling, grinding, 3-roll milling and high-energy ball milling may be used instead of the sonicator.

Meanwhile, the method of manufacturing a composite carbon sheet according to a first embodiment of the present invention includes the steps of: preparing a first solution (dispersant) using water or one or more selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose (S110); preparing a second solution (binder) by mixing polyester with urethane at a predetermined mixing ratio or by mixing silane (adhesion enhancer) with epoxy at a predetermined mixing ratio (S120); preparing a third solution by mixing the first solution with the second solution at a predetermined mixing ratio (S130); preparing a fourth solution (final solution) by mixing the third solution with one or more carbon nanowires selected from the group consisting of single-wall carbon nanotubes, double-wall carbon nanotubes, multi-wall carbon nanotubes, carbon nanofiber, carbon nanoparticles, graphene and fullerene at a predetermined mixing ratio (S140); preparing a mixed dispersion solution by pouring the fourth solution (final solution) into a beaker or a dispersion container and then dispersing the fourth solution using a sonicator (S150); and coating an expanded graphite sheet with the mixed dispersion solution (S160).

In the step of coating the expanded graphite sheet with the mixed dispersion solution (S160), the thickness of the mixed dispersion solution applied on the expanded graphite is 0.2~5 µm, and the expanded graphite sheet is coated with the mixed dispersion solution using at least one of roll coating, knife coating and spray coating.

In the step of preparing the first solution (S110), when the first solution is prepared using two or more compounds, each of the compounds is mixed in an amount of 50 parts by weight.

In the step of preparing the second solution (S120), when the second solution is prepared by mixing polyester with urethane, 20 parts by weight of polyester is mixed with 80 parts by weight of urethane, and when the second solution is prepared by mixing silane with epoxy, 2 parts by weight of silane is mixed with 98 parts by weight of epoxy.

In the step of preparing the third solution (S130), 70 parts by weight of the first solution is mixed with 30 parts by weight of the second solution.

In the step of preparing the fourth solution (S140), 97~80 parts by weight of the third solution is mixed with 3~20 parts by weight of one carbon nanowire selected from the group consisting of single-wall carbon nanotubes, double-wall carbon nanotubes, multi-wall carbon nanotubes, carbon nanofiber, carbon nanoparticles, graphene and fullerene. In this case, when two or more carbon nanowires are selected, each of the carbon nanowires is mixed in an amount of 1.5~10 parts by weight.

Hereinafter, preferred embodiments of the present invention will be described in more detail with reference to the attached drawings.

FIG. 1 is a flowchart showing a method of manufacturing a composite carbon sheet by coating an expanded graphite sheet with a mixed dispersion solution according to an embodiment of the present invention.

The method of manufacturing a composite carbon sheet according to the present invention is characterized in that a mixed dispersion solution is applied onto one side or both sides of an expanded graphite sheet placed at the working position, and then the expanded graphite sheet coated with the mixed dispersion solution is pressed to the desired target thickness of a final product by allowing a roll press to repetitively perform rolling processes. Accordingly, a composite carbon sheet having high thermal conductivity in horizontal and vertical directions can be provided.

As shown in FIG. 1, the method of manufacturing a composite carbon sheet according to the present invention includes the steps of: preparing a first solution (dispersant) using water or one or more selected compounds from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose (S110); preparing a second solution (binder) by mixing polyester with urethane at a predetermined mixing ratio or by mixing silane (adhesion enhancer) with epoxy at a predetermined mixing ratio (S120); preparing a third solution by mixing the first solution with the second solution at a predetermined mixing ratio (S130); preparing a fourth solution (final solution) by mixing the third solution with one or more carbon nanowires selected from the group consisting of single-wall carbon nanotubes, double-wall carbon nanotubes, multi-wall carbon nanotubes, carbon nanofiber, carbon nanoparticles, graphene and fullerene at a predetermined mixing ratio (S140); preparing a mixed dispersion solution by pouring the fourth solution (final solution) into a beaker or a dispersion container and then dispersing the fourth solution using a sonicator (S150); and coating an expanded graphite sheet with the mixed dispersion solution (S160).

In the step of preparing the first solution (S110), the first solution is prepared by using one compound or by mixing two or more compounds at a predetermined mixing ratio.

For example, the first solution (dispersant) is prepared using water or one or more compounds selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose. In this case, only ethyl alcohol may be selected, or ethyl alcohol and acetone may be selected. When ethyl alcohol and acetone are selected, the first solution is prepared by mixing 50 parts by weight of ethyl alcohol with 50 parts by weight of acetone.

In the step of preparing the second solution (S120), when the second solution (binder) is prepared by mixing polyester with urethane, the second solution is prepared by mixing 20 parts by weight of polyester with 80 parts by weight of urethane to prepare a urethane-base solution, and when the second solution is prepared by mixing silane with epoxy, the second solution is prepared by mixing 2 parts by weight of silane with 98 parts by weight of epoxy.

In the step of preparing the third solution (S130), the third solution is prepared by mixing the first solution with the second solution at predetermined mixing ratio, for example, by mixing 70 parts by weight of the first solution with 30 parts by weight of the second solution.

In the step of preparing the fourth solution (S140), the fourth solution (final solution) is prepared by mixing the third solution with one or more carbon nanowire selected from the group consisting of single-wall carbon nanotubes, double-wall carbon nanotubes, multi-wall carbon nanotubes, carbon nanofiber, carbon nanoparticles, graphene and fullerene at a predetermined mixing ratio.

For example, when carbon nanofiber is selected (one carbon nanowire is selected), 97~80 parts by weight of the third solution is mixed with 3~20 parts by weight of carbon nanofiber.

That is, 97 parts by weight of the third solution may be mixed with 3 parts by weight of carbon nanofiber.

Meanwhile, when carbon nanofiber and carbon nanoparticles are selected (one carbon nanowires are selected), 97~80 parts by weight of the third solution is mixed with 1.5~10 parts by weight of carbon nanofiber and 1.5~10 parts by weight of carbon nanoparticles.

That is, 97 parts by weight of the third solution may be mixed with 1.5 parts by weight of carbon nanofiber and 1.5 parts by weight of carbon nanoparticles.

In the step of preparing the mixed dispersion solution (S150), the mixed dispersion solution is prepared by pouring the fourth solution (final solution) into a beaker or a dispersion container and then dispersing the fourth solution using a sonicator.

In this case, at least one selected from the group consisting of ball milling, grinding, 3-roll milling and high-energy ball milling may be used instead of the sonicator.

Figure 2:
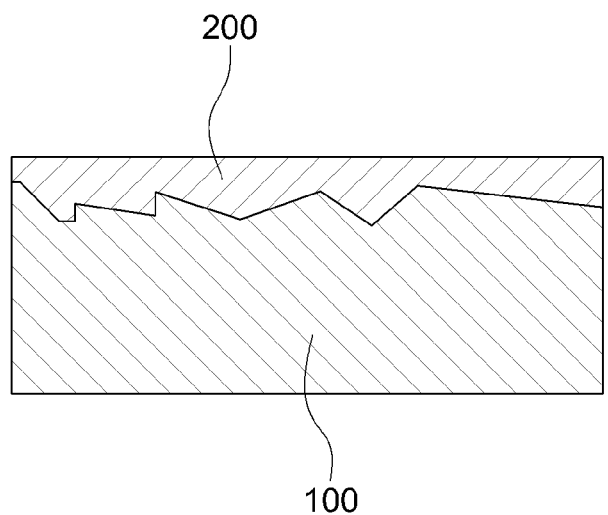
FIG. 2 is a sectional view showing a composite carbon sheet manufactured by the method according to an embodiment of the present invention.

After the step of preparing the mixed dispersion solution (S150), the expanded graphite sheet 100 is coated with the mixed dispersion solution 200. As shown in FIG. 2, the thickness of the mixed dispersion solution applied on the expanded graphite is 0.2~5 μm, and the expanded graphite sheet is coated with the mixed dispersion solution using at least one of roll coating, knife coating and spray coating.

The composite carbon sheet is a sheet obtained by filling the pores of the expanded graphite sheet with the mixed dispersion solution containing carbon nanowires and simultaneously coating the surface of the expanded graphite sheet with the mixed dispersion solution.

Therefore, the pores of the expanded graphite sheet 100 can be reduced, thus maximizing the thermal conductivity thereof. Further, when ceramic nanoparticles or polymer resins infiltrate into the pores and surface of the expanded graphite sheet, the adhesion between carbon particles in the expanded graphite sheet increases, so that the thermal conductivity of the expanded graphite sheet can be improved, the exfoliation of the expanded graphite sheet can be prevented, and the surface of the expanded graphite sheet can be electrically insulated.

Conventionally, an expanded graphite sheet was produced by refining, expanding and then continuously pressing predetermined sized graphite particles. In order to solve the problem of the produced expanded graphite sheet being exfoliated, one side of the expanded graphite sheet was coated with a protective tape made of polyethylene (PE) or polyethylene terephthalate (PET), and the other side thereof was coated with a double-sided adhesive tape made of polyethylene (PE) or polyethylene terephthalate (PET).

However, when the fault and surface of the expanded graphite sheet is observed using an electron microscope, it can be ascertained that many pores are formed when graphite particles are layered. For this reason, it can be seen that the thermal and electrical conductivity of the expanded graphite sheet is deteriorated due to the occurrence of the pores.

Particularly, the thermal and electrical conductivity of the expanded graphite sheet in a vertical direction is more decreased. Therefore, in order to solve the above problem, when the pores of the expanded graphite sheet are charged with carbon nanowires whose sizes are far smaller than those of expanded graphite particles, the density of the expanded graphite sheet can be increased, and the thermal and electrical conductivity can be improved. Further, when the surface of the expanded graphite sheet is coated with carbon nanowires, the conductivity of the expanded graphite sheet can be maximized, and the exfoliation of the expanded graphite sheet can be reduced.

Further, when carbon nanowires are mixed with ceramic nanoparticles or a polymer resin and then the surface of the expanded graphite sheet is coated with the mixture, the problem of the expanded graphite sheet being exfoliated and the problem of the expanded graphite sheet being electrically shorted can be solved.

The carbon nanowire may be one or more carbon nanowires selected from the group consisting of single-wall carbon nanotubes, double-wall carbon nanotubes, multi-wall carbon nanotubes, carbon nanofiber, carbon nanoparticles, graphene and fullerene.

Here, the dispersant may be water or one or more compounds selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose.

Further, the binder, which is a main component of the mixed dispersion solution, may be a urethane-based solution prepared by mixing polyester with urethane at a predetermined mixing ratio or may be an epoxy-based solution prepared by mixing silane (adhesion enhancer) with epoxy at a predetermined mixing ratio.

The coating layer of the mixed dispersion solution may be formed to a thickness of 0.2~5 μm, and may be formed by roll coating or knife coating.

For reference, roll coating is a process of coating one side of the expanded graphite sheet with the mixed dispersion solution using a roller, and knife coating is a process of applying a predetermined amount of the mixed dispersion solution onto one side of the expanded graphite sheet and then spreading the applied mixed dispersion solution to a predetermined thickness.

Further, in addition to the above process of directly coating the surface of the expanded graphite sheet with the mixed dispersion solution using a roller, a process of impregnating a PET or OPP back film with the mixed dispersion solution and then attaching the back film to the expanded graphite sheet while supplying both the expanded graphite sheet and the back film between a pair of urethane rollers may be used.

In the above process, the expanded graphite sheet is attached to the back film impregnated with the mixed dispersion solution, so that the gap between the back film and the expanded graphite sheet can be filled, and the adhesion between the back film and the expanded graphite sheet can be increased, thereby increasing thermal conductivity.

As shown in FIG. 3, it can be seen that higher heat radiation effect can be induced when the coating layer of the mixed dispersion solution is additionally formed.

For reference, examining the thermal conductivity of the composite carbon sheet in which the expanded graphite sheet coated with the mixed dispersion solution, it can be seen that the heat radiation effect of the composite carbon sheet is higher than that of a general expanded graphite sheet.

Embodiment 2

A second embodiment of the present invention is to provide a method of manufacturing a composite carbon sheet, including the steps: forming an intercalation compound between graphite layers using a mixture of lithium powder and paraffin; heat-treating the intercalation compound to prepare a stable and environment-friendly expanded graphite sheet; and coating the expanded graphite sheet with a mixed dispersion solution.

The process of forming an intercalation compound between graphite layers using lithium powder and paraffin is as follows.

Specifically, the method of manufacturing an expanded graphite sheet according to a second embodiment of the present invention includes the steps of: (1) mixing a primary mixture in which lithium powder and paraffin are mixed at a weight ratio of 1:1 with graphite powder to prepare a mixture and then reacting the mixture at a temperature of 180~230° C. and a pressure of 250~350 kg/cm$^2$ for 5~7 hours to chemically treat the mixture; (2) roughly pulverizing the chemically treated mixture in a particle size of 60 meshes or less; (3) immersing the roughly pulverized mixture in water and then taking it out at a temperature of 70~80° C. for one hour or more to water-treat the mixture; (4) drying the water-treated mixture; and (5) heat-treating the dried mixture at a temperature of 750~900° C.

In the step (1) of chemically treating the mixture, it is preferred that the mixing ratio of the primary mixture to the graphite powder be 10~30 wt %: 70~90 wt %. In the step (4) of drying the mixture, it is preferred that the mixture be dried at a temperature of 100° C. or more for two hours or more.

In the method of manufacturing an expanded graphite sheet according to the second embodiment of the present invention, an expanded graphite sheet including no sulfur oxides and nitrogen oxides can be simply and easily manufactured by mixing a primary mixture in which lithium powder and paraffin are mixed at a weight ratio of 1:1 with graphite powder to prepare a mixture, reacting the mixture at a temperature of 180~230° C. and a pressure of 250~350 kg/cm$^2$ for 5~7 hours to chemically treat the mixture, and then heat-treating the mixture at a temperature of 750~900° C.

The step (1) of chemically treating the mixture is characterized in that the intercalation compound is formed using the primary mixture of lithium powder and paraffin instead of an oxidant or strong acid. The primary mixture of lithium powder and paraffin can greatly reduce the amount of sulfur oxides and nitrogen oxides remaining in the obtained expanded graphite. In order to easily form the intercalation compound, the primary mixture is mixed with graphite powder to a mixture, and the mixture may be reacted at a temperature of 180~230° C. and a pressure of 250~350 kg/cm$^2$ for 5~7 hours. When the reaction temperature is lower than 180° C., there is a problem in that the reaction of the mixture is not sufficiently conducted. Conversely, when the reaction temperature is higher than 230° C., there is a problem in that paraffin is denatured and lost. Further, when the reaction pressure is lower than 250 kg/cm$^2$, there is a problem in that the reaction of the mixture is not sufficiently conducted. Conversely, when the reaction pressure is higher than 350 kg/cm$^2$, there is a problem in that the reaction pressure is unnecessarily increased. Further, when the reaction time is less than 5 hours, there is a problem in that the reaction of the mixture is not sufficiently completed, and when the reaction time is more than 7 hours, there is a problem in that the reaction conditions cannot be maintained.

In this case, it is preferred that the mixing ratio of the primary mixture to the graphite powder be 10~30 wt %: 70~90 wt %. When the amount of the primary mixture is less than 10 wt %, there is a problem in that the amount of the intercalation compound formed in graphite is insufficient, thus reducing the expandability of graphite. Further, when the amount thereof is more than 30 wt %, there is a problem in that the physical properties of the obtained expanded graphite deteriorate.

In the step (2) of roughly pulverizing the chemically treated mixture, the chemically treated mixture is roughly pulverized in a particle size of 60 meshes or less applying a commonly used method and apparatus to uniformalize the particle sizes of the mixture. In the step (3) of water-treating the mixture, the roughly pulverized mixture is immersed in water and then taken out of water at a temperature of 70~80° C. for one hour or more to remove lithium. In the step (3) of drying the water-treated mixture, water is removed from the water-treated mixture. These pulverizing, water-treating and drying steps may be the same as or similar to those performed in conventional expanded graphite manufacturing methods. Particularly, in the drying step, it is preferred that the mixture be dried at a temperature of 100° C. or more for two hours or more. It can be understood to those skilled in the art that the expandability of graphite can be changed depending on the drying conditions thereof and that the amount of water remaining in the dried mixture can be controlled depending on the physical properties of the expanded graphite to be obtained.

Subsequently, in the step (5) of heat-treating the dried mixture, the dried mixture is heat-treated at a temperature of 750~900° C. to obtain the expanded graphite. This heat treatment step plays an important role in the determination of the expandability of graphite. It can be easily understood to those skilled in the art that the physical properties of the obtained expanded graphite can be controlled by controlling the expandability of graphite.

The process of coating the upper surface of the expanded graphite sheet prepared in this way with the mixed dispersion solution will be omitted because it is the same as the above-mentioned process.

As described above, according to the method of manufacturing a composite carbon sheet by coating an expanded graphite sheet with a mixed dispersion solution, the thermal conductivity of the manufactured composite carbon sheet in a vertical direction is improved, so that the difference between the thermal conductivity thereof in a horizontal direction and the thermal conductivity thereof in a vertical direction is decreased, thereby greatly improving the thermal conductivity thereof in a vertical direction.

Further, according to the method of manufacturing a composite carbon sheet by coating an expanded graphite sheet with a mixed dispersion solution, the tensile strength and tear strength of the manufactured composite carbon sheet can be improved, and it is possible to prevent an expanded graphite sheet from being exfoliated by the side effects occurring during a process of coating the expanded graphite sheet with a mixed dispersion solution.

The composite carbon sheet of the present invention will be used as a heat sinking plate in the field of next-generation flat panel displays, such as LCD, PDP, LED and the like, and will be used in PC, notebooks, netbooks, mobile appliances, heat sinking plates for automobiles, heat radiating elements for household appliances, and the like.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. A method of manufacturing a composite carbon sheet, comprising the steps of:
mixing lithium powder with paraffin at a weight ratio of 1:1 to prepare a primary mixture;
mixing the primary mixture with graphite powder to prepare a mixture;
pulverizing the mixture;
immersing the pulverized mixture in water at a predetermined temperature to water-treat the mixture;
drying the water-treated mixture;
heat-treating the dried mixture to prepare an expanded graphite sheet;
mixing 70 parts by weight of a first solution as a dispersant with 30 parts by weight of a second solution as a binder to prepare a third solution;
mixing 80~97 parts by weight of the third solution with 3~20 parts by weight of any one selected from the group consisting of single-wall carbon nanotubes, double-wall carbon nanotubes, multi-wall carbon nanotubes, carbon nanofibers, carbon nanoparticles, graphene and fullerene to prepare a fourth solution;
dispersing the fourth solution to prepare a mixed dispersion solution; and
coating the expanded graphite sheet with the mixed dispersion solution,
wherein the first solution is water or any one selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose.

2. A method of manufacturing a composite carbon sheet, comprising the steps of:
mixing lithium powder with paraffin at a weight ratio of 1:1 to prepare a primary mixture;
mixing the primary mixture with graphite powder to prepare a mixture;
pulverizing the mixture;
immersing the pulverized mixture in water at a predetermined temperature to water-treat the mixture;
drying the water-treated mixture;
heat-treating the dried mixture to prepare an expanded graphite sheet;
mixing 70 parts by weight of a first solution as a dispersant with 30 parts by weight of a second solution as a binder to prepare a third solution;
mixing 80~97 parts by weight of the third solution with 3~20 parts by weight of any one selected from the group consisting of single-wall carbon nanotubes, double-wall carbon nanotubes, multi-wall carbon nanotubes, carbon nanofibers, carbon nanoparticles, graphene and fullerene to prepare a fourth solution;
dispersing the fourth solution to prepare a mixed dispersion solution; and
coating the expanded graphite sheet with the mixed dispersion solution,
wherein the first solution is water or a mixture of two compounds selected from the group consisting of ethyl alcohol, methyl alcohol, isopropyl alcohol, acetone, methyl ethyl ketone, ethyl isoketone, ethylene glycol, aniline, toluene, chloroform sodium dodecyl sulfate, polyvinyl alcohol, triton X, hydroxypropyl cellulose and hydroxypropyl methylcellulose, and each of the two compounds is included in an amount of 50 parts by weight.

3. The method of claim 1, wherein the second solution is a mixture including 20 parts by weight of polyester and 80 parts by weight of urethane.

4. The method of claim 1, wherein the second solution is a mixture including 2 parts by weight of silane and 98 parts by weight of epoxy.

5. The method of claim 2, wherein the second solution is a mixture including 20 parts by weight of polyester and 80 parts by weight of urethane.

6. The method of claim 2, wherein the second solution is a mixture including 2 parts by weight of silane and 98 parts by weight of epoxy.

* * * * *